(12) United States Patent
Challa et al.

(10) Patent No.: US 9,508,093 B2
(45) Date of Patent: Nov. 29, 2016

(54) APPARATUS, METHOD AND SYSTEM FOR ELECTRONIC GIFTING

(71) Applicants: Nagesh Challa, Saratoga, CA (US); Venkata T. Gobburu, San Jose, CA (US)

(72) Inventors: Nagesh Challa, Saratoga, CA (US); Venkata T. Gobburu, San Jose, CA (US)

(73) Assignee: Mobeam, Inc., Palo Alto, CA (US)

( * ) Notice: Subject to any disclaimer, the term of this patent is extended or adjusted under 35 U.S.C. 154(b) by 650 days.

(21) Appl. No.: 13/671,532

(22) Filed: Nov. 7, 2012

(65) Prior Publication Data
US 2013/0218701 A1 Aug. 22, 2013

Related U.S. Application Data

(60) Provisional application No. 61/557,354, filed on Nov. 8, 2011.

(51) Int. Cl.
*G06Q 30/00* (2012.01)
*G06Q 30/06* (2012.01)
*G06Q 30/02* (2012.01)
*G06Q 20/32* (2012.01)

(52) U.S. Cl.
CPC .......... *G06Q 30/0601* (2013.01); *G06Q 20/32* (2013.01); *G06Q 30/0215* (2013.01)

(58) Field of Classification Search
CPC ..................... G06Q 30/08; G06Q 30/0601
USPC ................................ 705/26.1–27.2; 235/375
See application file for complete search history.

(56) References Cited

U.S. PATENT DOCUMENTS

| | | |
|---|---|---|
| 6,685,093 B2 | 2/2004 | Challa et al. |
| 6,736,322 B2 | 5/2004 | Gobburu et al. |
| 6,877,665 B2 | 4/2005 | Challa et al. |
| 7,028,906 B2 | 4/2006 | Challa et al. |
| 7,395,961 B2 | 7/2008 | Challa et al. |
| 7,857,225 B2 | 12/2010 | Challa et al. |
| 7,967,211 B2 | 6/2011 | Challa et al. |
| 8,172,142 B2 | 5/2012 | Gobburu et al. |
| 8,794,529 B2 | 8/2014 | Osborne et al. |

(Continued)

FOREIGN PATENT DOCUMENTS

WO WO2012/012468 A1 1/2012

OTHER PUBLICATIONS

American Express Company. eGift Cards from American Express [online], 2011 [retrieved on Sep. 26, 2011]. Retrieved from the Internet: <URL: https://www311.americanexpress.com/BOLVGCWeb/vgcfeOrder.do?program=AVCWEB&promotion=AG01&selleracctnbr=US001-EGIFT&producttypecd=AV&intling=GC:hmpg:eGift>. 2 pages.

(Continued)

*Primary Examiner* — Michael Misiaszek
*Assistant Examiner* — Katherine O'Sullivan

(57) ABSTRACT

Electronic gifting is performed using various devices, servers, and other system nodes on a network. A gifting server and a transaction facility server associated with a transaction facility have access to the network. A donor's personal electronic device and a recipient's personal electronic device also have access to the network. Both the donor personal electronic device and the recipient personal electronic device may be enabled with the light-simulated barcode technology and/or NFC technology. Financial systems such as, for example, credit card systems, banking systems, and loyalty card systems may also have access to the network, or may be directly accessible to the transactions facility systems.

10 Claims, 11 Drawing Sheets

(56) References Cited

U.S. PATENT DOCUMENTS

| | | | |
|---|---|---|---|
| 2008/0052164 A1* | 2/2008 | Abifaker | 705/14 |
| 2010/0325006 A1* | 12/2010 | White | 705/26 |
| 2011/0047039 A1* | 2/2011 | Crames | G06Q 20/206 705/18 |
| 2011/0213675 A1* | 9/2011 | Friedman | G06Q 30/02 705/26.7 |
| 2011/0215162 A1 | 9/2011 | Challa et al. | |
| 2012/0187184 A1 | 7/2012 | Challa et al. | |
| 2013/0075464 A1* | 3/2013 | Van Horn | G06Q 30/0207 235/375 |
| 2013/0218701 A1 | 8/2013 | Challa et al. | |
| 2014/0108123 A1 | 4/2014 | Russell et al. | |

OTHER PUBLICATIONS

Challa, Nagesh et al. Apparatus, Method and System of Electronic Gifting, U.S. Appl. No. 61/557,354, Nov. 8, 2011. 53 pages.

Starbucks Corporation. Starbucks Card eGift [online], undated [retrieved on Sep. 26, 2011]. Retrieved from the Internet: <URL: https://www.starbcks.com/card/egift>. 2 pages.

\* cited by examiner

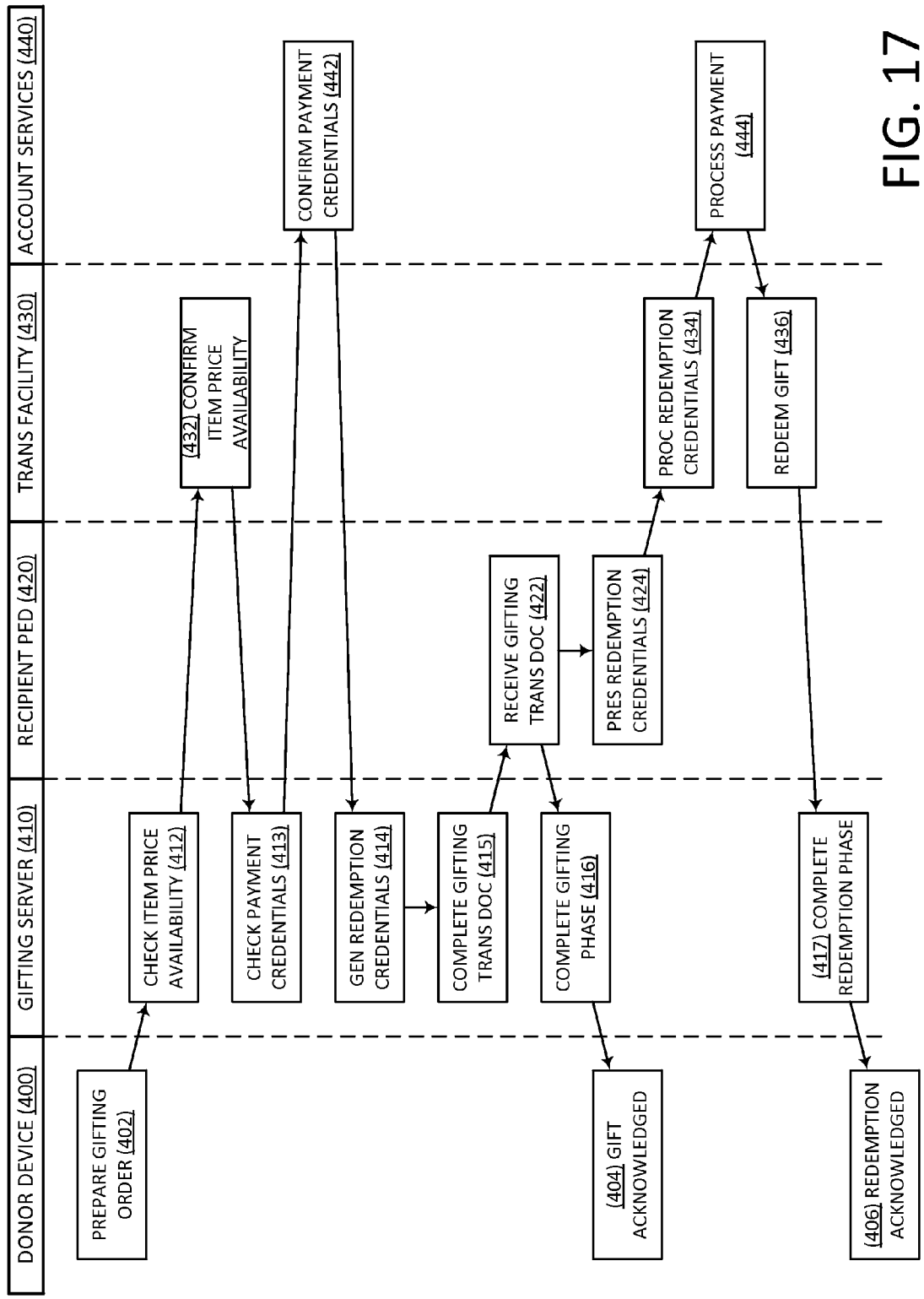

APPARATUS, METHOD AND SYSTEM FOR ELECTRONIC GIFTING

BACKGROUND OF THE INVENTION

Field of the Invention

This invention relates to electronic commerce, and more particularly to apparatus, methods and systems for electronic gifting.

Description of the Related Art

A very popular form of gifting is the gift card. A gift card is a restricted monetary equivalent or scrip that is issued by retailers or banks, and typically serves as an alternative to a non-monetary gift. A gift card typically is like a credit card in appearance, but often displays a specific theme for a particular retailer to which redemption is restricted. The gift card typically is identified by a specific number or code contained in a barcode or on a magnetic stripe, and is backed by an on-line electronic system for activation and redemption. The amount placed on the gift card at time of activation typically is low, ranging from a few dollars to a few hundred dollars. Some gift cards can be reloaded by payment and can be used multiple times. A gift card may be of the "network" or "closed loop" type. Network cards are issued by banks or credit card companies and are redeemable at various establishments. Closed loop cards are issued by and redeemable at a specific establishment.

While gift cards typically are in physical form, various companies offer electronic gift cards. One example is the American Express eGift Card, which is available from the American Express Company, World Financial Center, 200 Vesey Street, New York, N.Y. 10285, USA (https://www311.americanexpress.com/BOLVGCWeb/vgcfeOrder.do?program=AVCWE B&promotion=AG01&selleracctnbr.US001-EGIFT&producttypecd.AV&intlink.GC:hmpg:eGift). The gift giver purchases the eGift card on the American Express Company website. The person for whom the gift is intended receives an e-mail shortly after purchase that contains instructions on how to activate the eGift card. After activation, the eGift card can be used for online shopping or phone orders at merchants in the United States that accept the American Express Card. Because there is no physical card associated with an eGift Card, it may not be accepted by merchants for in-store purchases. An example is the Starbucks Card eGift, which is available from Starbucks Corporation of 2401 Utah Avenue South, Seattle, Wash. 98134, USA (https://www.starbucks.com/shop/card/egift). The gift giver purchases the eGift card on the Starbucks Corporation website, which is delivered to the person for whom the gift is intended via email.

BRIEF SUMMARY OF THE INVENTION

One embodiment of the invention is a method of gifting comprising: preparing a gifting order on a donor device, the gifting order including a gift designator designating a gift; communicating the gifting order to a gifting server; preparing a gifting transaction document on the gifting server, the gifting transaction document including redemption credentials; incrementing a recipient account in accordance with the gift designator; communicating the gifting transaction document to a personal electronic device; presenting the redemption credentials from the personal electronic device to a transaction facility; decrementing the recipient account in response to the redemption credentials presenting step, in accordance with the gift designator; and providing the gift to the recipient from the transaction facility.

Another embodiment of the invention is a system for gifting comprising: a donor device comprising a processor and a memory coupled to the processor, the memory having computer programs stored therein for preparing a gifting order, the gifting order including a gift designator designating a gift; a gifting server comprising a processor and a memory coupled to the processor, the memory having computer programs stored therein for receiving the gifting order; for preparing a gifting transaction document from the gifting order, the gifting transaction document including redemption credentials; and for incrementing a recipient account in accordance with the gift designator; a recipient personal electronic device comprising a processor and a memory coupled to the processor, the memory having computer programs stored therein for receiving the gifting transaction document, and for presenting the redemption credentials from the personal electronic device to a transaction facility; the memory of the gifting server further having computer programs stored therein for decrementing the recipient account in response to presentation of the redemption credentials by the recipient personal electronic device and in accordance with the gift designator; and a network coupling the donor device, the gifting server and the recipient personal electronic device to one another for communicating the gifting order from the donor device to the gifting server, and for communicating the gifting transaction document from the gifting server to a personal electronic device.

Another embodiment of the invention is a system for gifting comprising: a donor device comprising a processor and a memory coupled to the processor, the memory having computer programs stored therein for preparing a gifting order, the gifting order including a gift designator designating a gift; a gifting server having a processor and a memory coupled to the processor, the memory having computer programs stored therein for receiving the gifting order, and for preparing a gifting transaction document from the gifting order, the gifting transaction document including redemption credentials; a remote account server comprising a processor and a memory coupled to the processor, the memory having computer programs stored therein for processing requests for payment authorization, and for incrementing a recipient account in accordance with the gift designator; a recipient personal electronic device having a processor and a memory coupled to the processor, the memory having computer programs stored therein for receiving the gifting transaction document, and for presenting the redemption credentials from the personal electronic device to a transaction facility; the memory of the remote account server further having computer programs stored therein for decrementing the recipient account in response to presentation of the redemption credentials by the recipient personal electronic device and in accordance with the gift designator; and a network coupling the donor device, the gifting server, the remote account server, and the recipient personal electronic device to one another for communicating the gifting order from the donor device to the gifting server, for communicating the gift designator from the gifting server to the remote account server, and for communicating the gifting transaction document from the gifting server to a personal electronic device.

Another embodiment of the invention is a server for gifting comprising: a processor; and a memory coupled to the processor, the memory having computer programs stored therein for: receiving a gifting order from a donor device over a network, the gifting order including a gift designator designating a gift; preparing a gifting transaction document from the gifting order, the gifting transaction document including redemption credentials; and for communicating the gifting transaction document to a recipient personal electronic device over a network.

Another embodiment of the invention is a personal electronic device for gifting comprising: a processor; a presentation component coupled to the processor; and a memory coupled to the processor, the memory having computer programs stored therein for: preparing a gifting order on a donor device, the gifting order including a gift designator designating a gift; communicating the gifting order to a gifting server; receiving a gifting transaction document from the gifting server, the gifting transaction document including redemption credentials; and presenting the redemption credentials from the presentation component to a transaction facility.

BRIEF DESCRIPTION OF THE SEVERAL VIEWS OF THE DRAWINGS

FIG. 17 is a schematic flow diagram of a method for electronic gifting which furnishes account information to the transaction facility at redemption.

DETAILED DESCRIPTION OF THE INVENTION, INCLUDING THE BEST MODE

Figure 1:
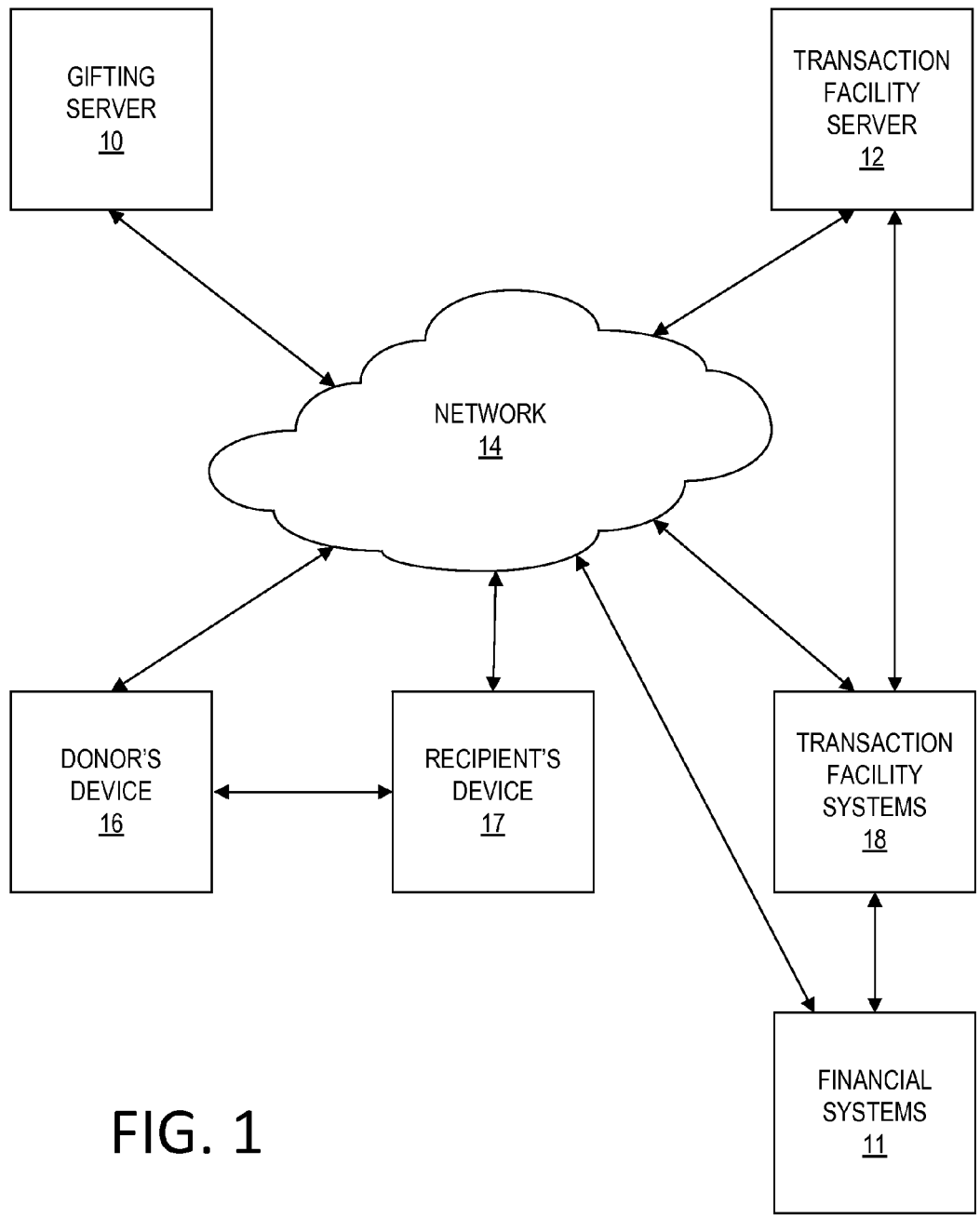
FIG. 1 is a schematic diagram showing a network arrangement of a gifting server, transaction facility server, and various personal electronic devices.

The techniques described herein facilitate the reliable and widespread communication of information in support of electronic gifting by one or more donors to one or more recipients using personal electronic devices. The term "gift" is a broad term which means anything physical or virtual that is provided to another without requiring compensation. In the case of a physical item, for example, the gift may be a right to acquire the item. In the case of monetary credit, for example, the gift may be a right to use a specific amount of the credit. In the case of money held in a bank demand account, for example, the gift may be a right to use a specified amount of the balance present in the account. In the case of a store credit such as represented by a gift card or loyalty program, for example, the gift may be a right to use a specified amount of the store credit. In the case of a promotion, for example, the gift may be a right to purchase or acquire goods or services at a discounted price or even at no cost, such as represented by a coupon or other form of incentive award. The gift may be a right to enter a transaction facility to enjoy an entertainment or sports event or to attend a meeting, as expressed by a ticket or other form of invitation or expression of right to enter the transaction facility. A donor is any entity, natural or artificial, including its surrogates, that can make the gift, and a recipient is any entity, natural or artificial, including its surrogates, that can receive the gift. Examples of donors include natural persons, manufacturers, merchants, clubs, travel service providers such as airlines and car services, service providers such as lawyers, doctors and accountants, and so forth. Examples of recipients include natural persons, families and organizations. A recipient may become a donor and a donor may become a recipient, depending on changes in circumstances. Personal electronic devices are digital electronic devices that may be used for personal purposes, and include such devices as mobile phones, personal digital assistants ("PDA"), gaming devices, audio and video players, fobs, USB Flash drives, tablets, laptops, personal computers, and a variety of multimedia convergence products such as the IPHONE™ mobile digital device available from Apple Inc. of Cupertino, Calif., USA, and various mobile digital devices that run the Android operating system. Personal electronic devices are suitable for many uses, including communications, entertainment, security, commerce, guidance, data storage and transfer, and so forth, and a particular device may be dedicated to a particular use or may be suitable for many different uses. These techniques described herein enable the large and growing population of personal electronic devices to effectively use various communications protocols to interact with one another for electronic gifting, as well as with both new and old commercial infrastructure.

Electronic gifting and redemption may be performed from any type of device to a personal electronic device, and between two or more personal electronic devices. Depending on the implementation, gifting in this manner may have such advantages as flexibility as to how and were sent and how and where received, simplicity, transfer speed, immediacy of use, and recordkeeping (electronic receipts and transaction records), including any combination thereof. Electronic gifting and redemption also may be performed between a personal electronic device and a transactions system at a transaction facility. Depending on the implementation, gifting in this manner may have any or all of the previously-mentioned advantages, as well as providing the transaction facility operator such other benefits as better tracking of transaction facility use and opportunities for acquiring information about the donor and recipient of the gift, for targeted marketing, and for enrollment of the recipient in loyalty programs and information services. Where electronic gifting is performed by a mobile phone or a mobile convergence device, for example, the advantages to the donor include the convenience of immediacy of use and readily accessible records. For the merchant, the ability of donors to make a large number of small gifts, even impulse gifts, from their mobile phones and convergence devices has the potential to greatly increase the number of visitors to the transaction facility, relative to a smaller number of larger gifts as is conventional. For recipients such as remote family members, remittances to them may be made quickly, easily and conveniently made in smaller frequent increments and as needed, rather than in large spread apart increments. Generally, recipients have a great deal of flexibility as to where and how to receive gifts. Even recipients who have mobile devices that are not wireless communications enabled, such recipients may receive gifts on their personal computers at home, and transfer the gifts from the personal computer to the mobile device. An example of such a mobile device is the NUMI™ key, which is available from MoBeam Inc. of Cupertino, Calif., USA. Donors have substantially flexibility as to the type of personal electronic device they may use, ranging from home personal computers to mobile phones.

Electronic gifting is most effective when redemption is widely enabled, easy and reliable. Many facilities such as, for example, points-of-sale, event entry stations, and security checkpoints, are equipped with standard barcode scanners which are suitable for reading barcoded gift cards. In some instances, such scanners may be able to read a barcode presented on a screen of a personal electronic device. However, a more robust and reliable technique is to use light-simulated barcode technology for redemption with a personal electronic device. Many personal electronic devices have or can be equipped with light sources such as the device screen, infrared ports, and LEDs that may be driven by a simulated signal so that light from the light source simulates a reflection of a scanning beam being moved across a static visual image of the barcode, including 1-D and 2-D barcodes. The technique for communicating information to a barcode scanner with light that simulates a reflection of a scanning beam being moved across a static visual image of the barcode may be referred to as "light-simulated barcode technology" and is described in, for example, U.S. Pat. No. 6,685,093 issued Feb. 3, 2004 to Challa et al., U.S. Pat. No. 6,877,665 issued Apr. 12, 2005 to Challa et al., U.S. Pat. No. 7,028,906 issued Apr. 18, 2006 to Challa et al., U.S. Pat. No. 7,395,961 issued Jul. 8, 2008 to Challa et al., U.S. Pat. No. 7,857,225 issued Dec. 28, 2010 to Challa et al., and U.S. Pat. No. 7,967,211 issued Jun. 28, 2011 to Challa et al., all of which hereby are incorporated herein in their entirety by reference thereto. The term "light" is a broad term which includes infrared light as well as visible light. Personal electronic devices enabled with the light-simulated barcode technology are attractive to operators of facilities equipped with standard barcode scanners, since they provide an additional and efficient way for transaction facility users to carry out transactions without requiring the transaction facility operators to replace, supplement or even modify their barcode scanners.

As newer commercial transaction technologies such as Near Field Communications ("NFC") technology and Radio Frequency Identification ("RFID") emerge, personal electronic devices may be equipped to take advantage of them. NFC may operate in various modes such as, for example, Card Emulation Mode, Peer-to-Peer Mode, and Reader-Writer Mode. Card Emulation Mode permits the personal electronic device to be used to perform secure transactions such as mobile payments, including smart card like transactions. Peer-to-Peer Mode permits data transfer between two NFC devices in proximity to one another for services as diverse as mobile ticketing transactions and exchange of business cards. Reader-Writer Mode permits a one-way data acquisition of information. The term "NFC" as used herein is a broad term which is inclusive of "RFID" but is not essentially defined by RFID. In this sense, a RFID tag may be considered a type of NFC tag, but a NFC tag does not require the particular attributes of a RFID tag. Similarly, a RFID reader may be considered to be a type of NFC terminal, but a NFC terminal does not require the ability to read RFID tags. While NFC may not be as widely implemented as barcode scanners, mobile phones that incorporate NFC technology and run NFC applications are well known in the art. NFC technology may be implement alone or along with light-simulated barcode technology for communicating barcode information, so that the mobile phone may still be used in transactions at points of sale that are equipped with barcode scanners, even if lacking the more advanced but not widely adopted NFC technology.

Personal electronic devices may have NFC technology and light-simulated barcode technology (and other communications protocols if desired) either built-in or provided by an accessory, as are described in U.S. Pat. No. 7,857,225 issued Dec. 28, 2010 to Challa et al., and in U.S. patent application Ser. No. 13/186,257 filed Jul. 19, 2011 in the name of Challa et al. (published as US 2012/0187184 on Jul. 26, 2012), which are incorporated herein in their entirety by reference thereto.

A system architecture suitable for gifting with personal electronic devices enabled with light-simulated barcode technology is shown in FIG. 1. A network 14 supports communications between various devices, servers, and other system nodes. The communication may be wired or wireless or both using any suitable technology. A typical network includes the internet, various telephony networks such as GSM and CDMA, various local area networks, various short range networks such as Bluetooth, and any combination thereof, but many other network and communications protocols are well known in the art and are suitable for use within the network 14.

Various servers communicate over the network 14. A server provides services across a network, either to private users inside a large organization or to public users via the Internet. In the context of client-server architecture, a server may be thought of as a computer program running to serve the requests of "client" programs. The server performs some computational task on behalf of the clients. The clients either run on the same computer as the server, or connect to the server computer through the network. In common usage, a server may be thought of as a physical computer dedicated to running one or more services as a host, to serve the needs of users of the other computers on the network. In the context of Internet Protocol (IP) networking, a server may be thought of as a program that operates as a socket listener.

As further shown in FIG. 1, a gifting server 10 and a transaction facility server 12 associated with a transaction facility 18 are shown with access to the network 14. The transaction facility server 12 may be part of the transaction facility and directly interact with the transaction facility systems 18, or may be remote from the transaction facility and interact with the transaction facility systems 18 via the network 14. A donor's device 16, which may be a personal electronic device, and a recipient's device 17, which may be a personal electronic device, are shown with access to the network 14, and may have peer-to-peer access or wireless local area network access to one another. Both the donor device 16 and the recipient device 17 may be enabled with the light-simulated barcode technology (not shown) and the NFC technology (not shown), and the transaction facility systems may include a conventional barcode scanner (not shown) or a NFC terminal (not shown). Financial systems 11 such as, for example, credit card systems, banking systems, and loyalty card systems may also have access to the network, or may be directly accessible to the transactions facility systems 18 in any suitable manner, including dial-up. The various lines of communication shown in FIG. 1 are illustrative, and some networks may not include all of them, while other networks may include additional capabilities.

Figures 2, 3:
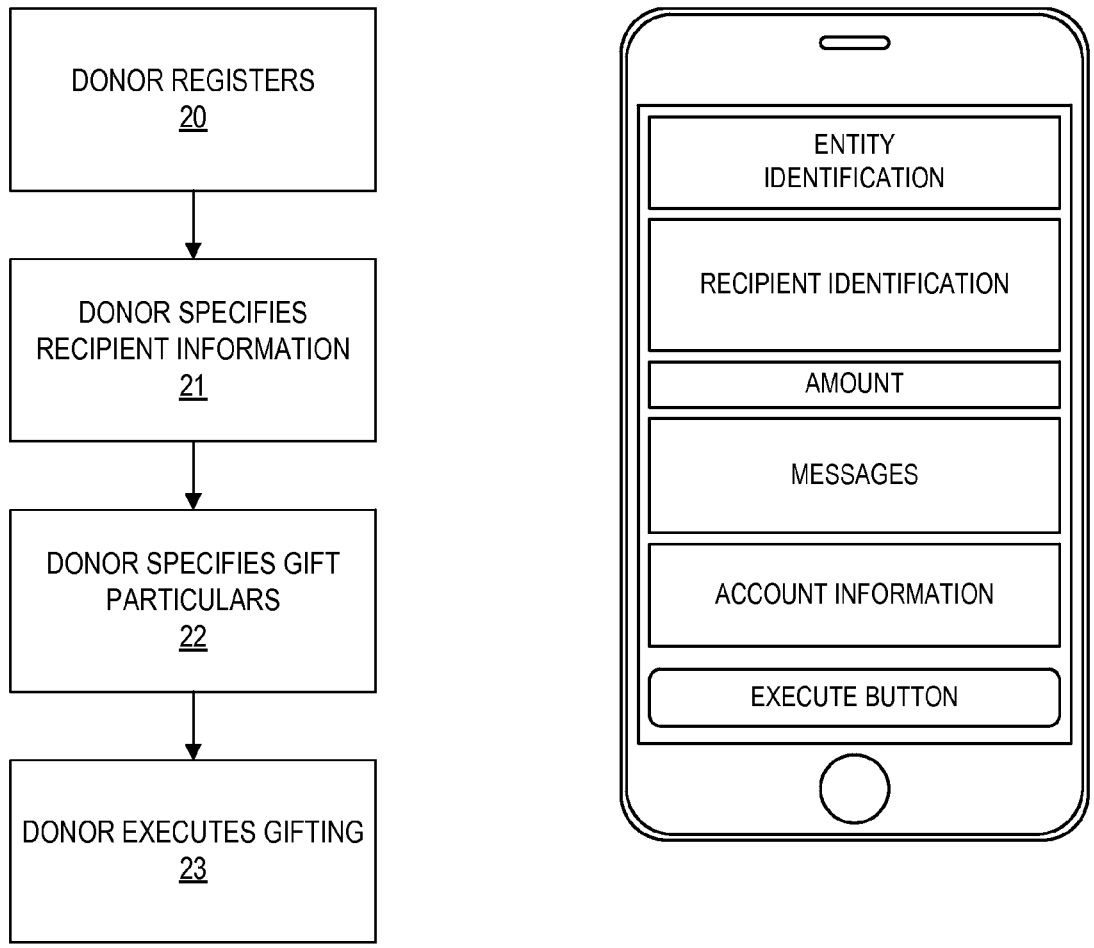
FIG. 2 is a flowchart of donor actions in a gifting process.
FIG. 3 is a schematic diagram showing how various information may be displayed on a donor's personal electronic device.

Gifting with personal electronic devices enabled with the light-simulated barcode technology may proceed in the manner shown in FIG. 2. The donor registers with the gifting server 10 (block 100). This registration may be done by a specialized gifting application installed on the personal electronic device, or by a facility application installed on the personal electronic device that includes a gifting component. The registration process may vary in complexity, ranging from a very simple procedure wherein the gifting server 10 recognized the donor's personal electronic device for a single one-time transaction in a manner transparent to the donor, to a more involved procedure wherein the gifting server 10 interacts with the donor through the donor's personal electronic device to establish and maintain a secure record of the donor's identity and transaction history with the transaction facility, possibly along with other relevant information about the donor and the donor's interests.

Using her personal electronic device, the donor specifies information about the recipient (block 21). Suitable recipient information includes the recipient's name, electronic contact information such as a phone number for SMS and other such messaging or email address.

Using her personal electronic device, the donor also designates the gift type and amount (block 22). If the gift is money or a specific good or service, any electronically verifiable type of payment may be used for the gift, including credit cards, bank accounts, demand accounts, private credits, loyalty card account credits, and so forth. If the gift is an item already owned by the donor and held at the transaction facility, the gifting server 10 may query the transaction facility server 12 to verify availability.

Upon reviewing the information entered on her personal electronic device to ensure accuracy, the donor executes the gift (block 23). Gift execution may be initiated in any desired manner, including, for example, by pressing a virtual button displayed for this purpose, giving a voice command, and so forth.

The donor's personal electronic device may include measures to prevent the recipient from falling victim to spam and phishing attacks. One exemplary measure is the use of a security token. When executing the gift, the donor's personal electronic device may send a security token to the gifting server 10, and also to the recipient's personal electronic device. The security token may be specified by the donor, or may be auto-generated by the donor's personal electronic device. The security token may be communicated to the recipient's personal electronic device in any desired manner, including, for example, directly by SMS, text, email, or voicemail, and may be used, for example, when the recipient is informed of gift availability (block 43 in FIG. 4) or during the registration or verification process (block 45 in FIG. 4) to detect span and phishing attacks.

The sequence of operations shown by blocks 21, 22 and 23 is illustrative, and may be varied as desired.

FIG. 3 shows an illustrative smartphone or convergence device which includes screen portions set aside for various gifting purposes in accordance with the donor client application. The entity identification at the top of the screen identifies the business entity which is to supply the gift, illustratively a retailer. The succeeding screen regions from top to bottom are for displaying the identification of the recipient as entered by the donor, for displaying the amount of the gift as entered by the donor, for displaying messages to the recipient as entered by the donor and, if desired, messages from the recipient, and for displaying payment account information as entered by the donor. A virtual "execute gifting" button is provided at the bottom of the screen.

Figure 4:
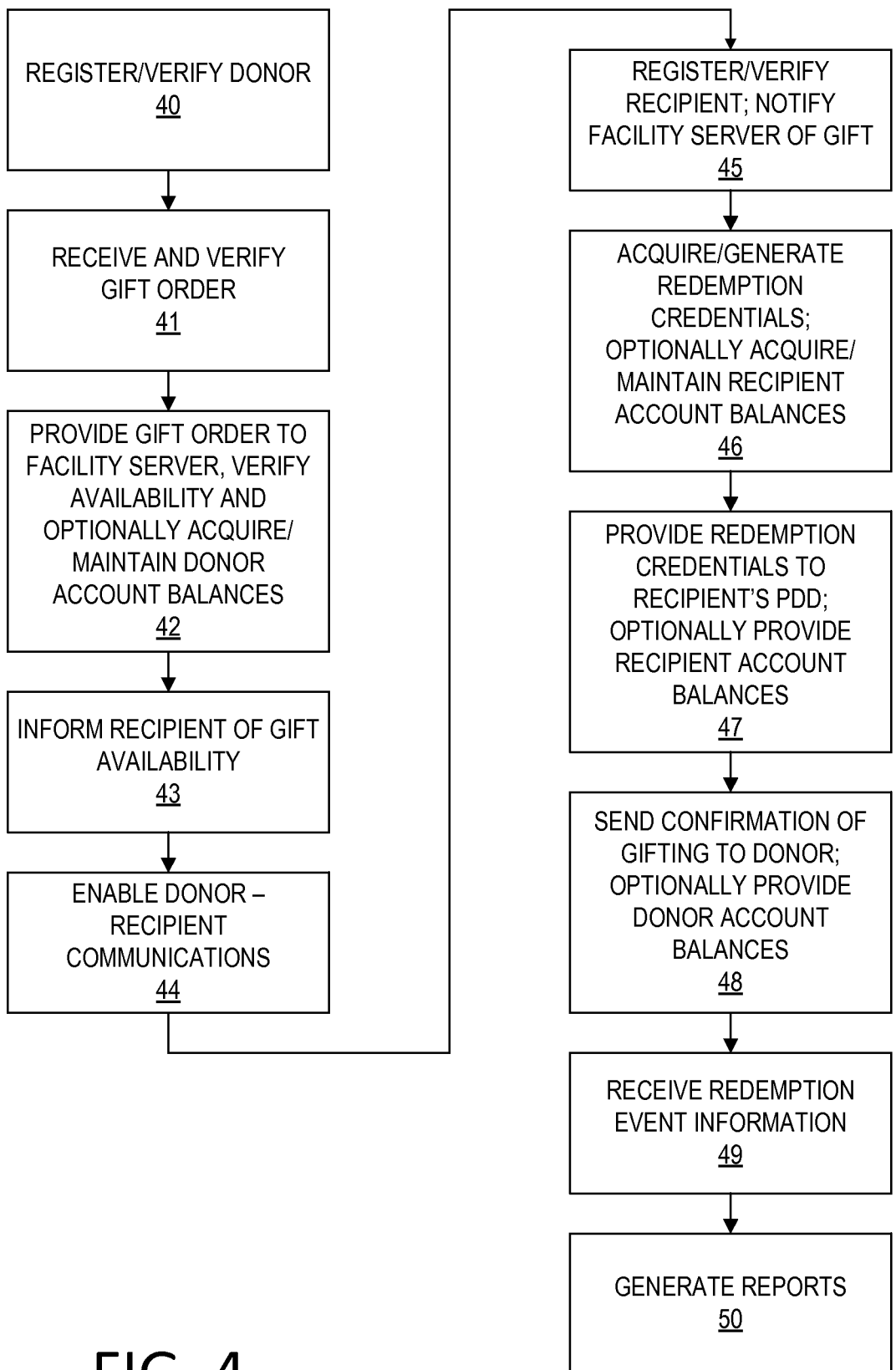
FIG. 4 is a flowchart showing various operations of the gifting server of FIG. 1.

FIG. 4 shows the various processes carried out by the gifting server 10. If the donor is not registered, the gifting server 10 interacts with the donor's personal electronic device to register the donor in any desired manner (block 40). The registration process may vary in complexity, and may be for a one-time gifting transaction or for recurring gifting transactions. For a future gift transaction or transactions and recurring gifting transactions, either the gift itself may be triggered automatically, or a reminder to make the gift may be triggered automatically. The triggering event may be any threshold, schedule, condition or situation that is capable of being monitored, such as the remaining value of a previously made gift, a particular recurring day or event such as a birthday, a dreary weather day, an account balance of the donor, the purchase of a particular product or amount of product, and so forth. Where the donor is registered for recurring gifting transactions, the gifting server 10 may include security measures to verify the donor's identity before interacting with the donor through the donor's personal electronic device to establish and maintain a secure record of the donor's identity and transaction history with the transaction facility, possibly along with other relevant information about the donor and the donor's other transactions and interests.

The gifting server 10 then receives and verifies the gift order (block 41). If desired, the gifting server 10 may communicate with the transaction facility server 12 to verify availability and price of the gift (block 42). Advantageously, the gifting server 10 may make use of the existing infrastructure of the transaction facility to verify gift availability and price. Where the gift is a gift of money charged to a credit card, for example, the gifting server 10 may rely on the transaction facility server 12 to debit the donor's credit card in the amount of the gift. Where the gift is of credits from the donor's loyalty card account, for example, the gifting server 10 may rely on the transaction facility server 12 to debit the donor's loyalty card account in the amount of the gift. While debiting the donor's account at the time the gift is made ensures that the gift is available to the recipient, the donor may be provided with an opportunity to revoke the gift. If desired, debiting of the donor's account may be deferred until the recipient attempts to redeem the gift. While the gifting server 10 may, if desired, be provided with the capability of directly determining gift availability, the ability of the gifting server 10 to interact with the existing infrastructure of the transaction facility and without extensively modifying the transaction facility server 12 minimizes disruptions to the facility operations and allows the transaction facility server 12 to maintain control over and the confidentiality of internal functions.

The gifting server 10 then may inform the recipient of the gift, including the gift amount and where the gift may be redeemed (block 43), and may enable communications between the donor and recipient (block 44). Communications may be enable in any desired manner, including texting, instant messaging, hosted communication, and so forth. The recipient is invited to accept the gift, which may be done through a registration process if the recipient is not already registered, or by verify the recipient's identify if the recipient is already registered (block 45). The registration process may vary in complexity, and may be for a one-time gifting transaction or for recurring gifting transactions. Where the recipient is not registered, the gifting server 10 may invite the recipient to register in any convenient manner, such as by downloading and installing a client application on her personal electronic device, or by sending a message such as an email or text message to the recipient to visit a registration website, which may be initiated by the gifting server 10 (including surrogates thereof). The message may include a pre-assigned user identification so as to match the recipient to the gift. Where the recipient is registered for recurring gifting transactions, the gifting server 10 may include security measures to verify the recipient's identity before interacting with the recipient through the recipient's personal electronic device to establish and maintain a secure record of the recipient's identity and transaction history with the transaction facility, possibly along with other relevant information about the recipient and the recipient's other transactions and interests. When the gift is accepted by the recipient, the gifting server 10 may provide confirmation of the gift transaction to the transaction facility server 12 so that the gifting transaction may be authorized.

The recipient's personal electronic device may use a security token provided by the donor's personal electronic device to detect spam and phishing attacks in the following manner. When the gifting server 10 informs the recipient of gift availability (block 43), for example, or during the registration or verification process (block 45), for example, the gifting server 10 may furnish the security token which it received from the donor to the recipient. The security tokens received from the gifting server 10 and from the donor's personal electronic device may be compared and the gifting server 10 may be authenticated where the security tokens match. Where the security tokens do not match, the gift is likely spam or phishing and may be rejected or ignored. The comparison may be done with the recipient's personal electronic device in any desired manner, including manually by the recipient or automatically by the recipient's personal electronic device.

When registration or verification is complete and the gift authorized by the transaction facility server 12, the gifting server 10 may provide confirmation of the gift and redemption credentials to the recipient's personal electronic device (block 46). Optionally, the gifting server 10 may either acquire the recipient's account balances from the retailer or maintain the account balances itself (block 46), and provide this information to the recipient (block 47).

Additional services may be provided to the donor upon completion of the gifting transaction. As part of the donor registration process, for example, the donor may opt-in or opt-out to a gift tracking and recommendation service. The gifting server 10 may acquire data about what the recipient used the gift for and provide this data to the donor, provide the donor with recommendations for future gifting, or provide both data and recommendations. The data may include an identification of the goods or services received, the price, the date, and where the goods or services were received. The data may be filtered or aggregated as desired; for example, redemption of a monetary gift for a tennis racquet may be reported as a sporting goods item. The gifting server 10 may also interact with social networks and media in any way desired by the donor, the recipient, or by mutual consent. In the case of a recipient's Facebook account, for example, if the recipient "accepts" wall postings, then the gifting server 10 may automatically post a congratulatory note regarding the gifted item, such as "Congratulations on your new tent!" Similarly, if the donor "accepts" wall postings, the gifting server 10 may automatically post a note regarding the gifted event, such as "I gave John a new tent for his birthday!"

Figure 5:
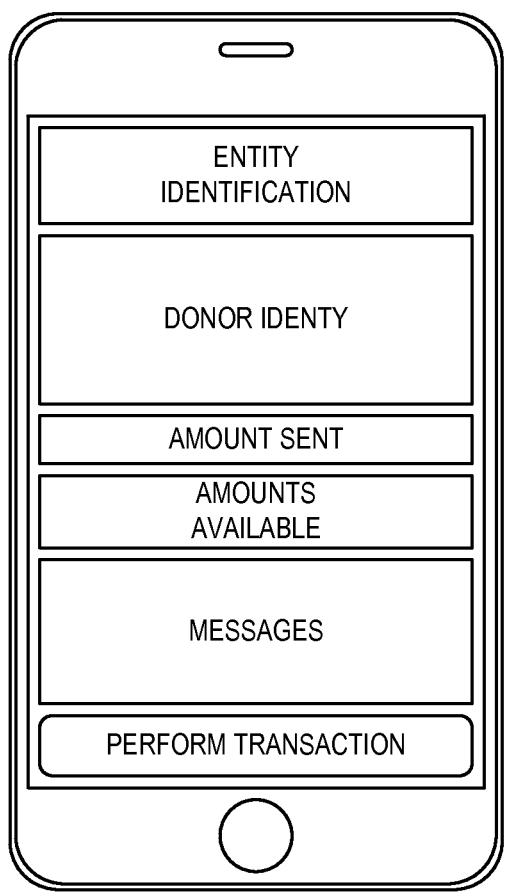
FIG. 5 is a schematic diagram showing how various information may be displayed on a recipient's personal electronic device.

FIG. 5 shows an illustrative smartphone or convergence device which includes screen portions set aside for various gifting purposes in accordance with the recipient client application. The entity identification at the top of the screen identifies the business entity which is to supply the gift, illustratively a retailer. If the gift may be supplied by different business entities, the names of the various entities may be scrolled, or the entity identification may be blanked. The succeeding screen regions from top to bottom are for displaying the identity of the donor, for displaying the amount of the gift, for displaying the amounts available due to other gifts or deposits, and for displaying conversations with or messages from the donor, and for displaying payment account information as entered by the donor. A virtual "perform transaction" button is provided at the bottom of the screen.

As further shown in FIG. 4, the gifting server 10 may send confirmation of gifting to the donor (block 48) in conjunction with providing the redemption credentials to the recipient's personal electronic device. Optionally, the gifting server 10 may either acquire the recipient's account balances from the retailer or maintain the account balances itself (block 42), and provide this information to the recipient (block 48). In addition, the gifting server 10 may receive redemption event information from the transaction facility server 12 (block 49) and may generate reports for the transaction facility operator (block 50).

Advantageously, the gifting process has the capability of greatly expanding the customer base available to the transaction facility operator. During the registration process, the recipient may be presented with the opportunity (by either opt-in or opt-out) to participate in the various programs and offers provided by the transaction facility. Where the transaction facility is a retailer, for example, the retailer may offer a loyalty program, retailer magazine, product and service specials, and coupons. Using permissions given by or inferred from the recipient, the gifting server 10 may inform the transaction facility server 12 of these permissions so that the transaction facility server 12 may provide such additional opportunities to the gift recipient. Alternatively, the recipient may interact with the transaction facility server 12 or another type of server such as a promotions server, through a frame or an additional window, for example, to participate in the various programs and offers provided by the transaction facility, or by manufacturers and suppliers or other third parties authorized by the transaction facility. If desired, the gifting server 10 may itself have the capability of gifting, or may provide promotional material such as coupons in a conventional manner.

Figure 6:
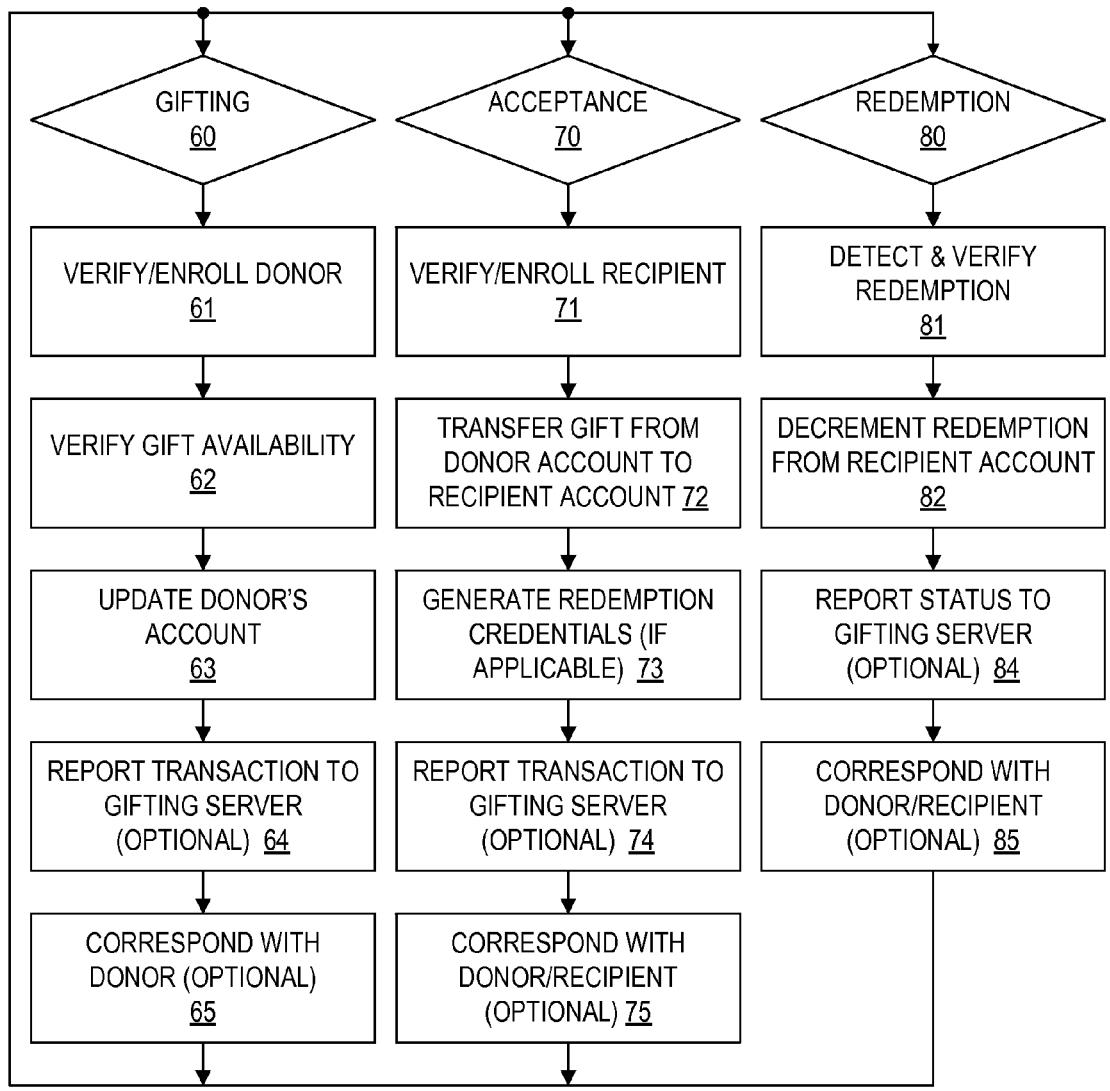
FIG. 6 is a flowchart showing various operations of the transaction facility server of FIG. 1.

FIG. 6 shows various illustrative processes carried out by the transaction facility server 12. When a gifting event occurs, the gifting server 10 and the transaction facility server 12 may cooperate to either register the donor or verify the donor's prior registration (block 61). Either the gifting server 10 or the transaction facility server 12 (or indeed even another server (not shown)) may host the donor's account, but in many retail situations the transaction facility server 12 already hosts the donor's account so that allowing the transaction facility server 12 to continue to host the donor's account is particularly advantageous. Moreover, having the transaction facility server 12 continue to host the donor's account allows the transaction facility operator to provide additional services and marketing information to the donor, including invoking third party services as needed. Illustratively, functions such as secure communications with and security of data on the donor's personal electronic device may be handled by the gifting server 10, thereby relieving the transaction facility server 12 from the additional and unfamiliar task of performing these functions.

Upon detection of a gifting event, gift availability is verified (block 62). Either the gifting server 10 or the transaction facility server 12 (or indeed even another server (not shown)) may perform gift verification, but in many retail situations the transaction facility server 12 already performs gift verification so that allowing the transaction facility server 12 to continue to perform gift verification is particularly advantageous. Gift verification may involve processing a credit card charge with the credit company, obtaining funds from a demand account, debiting points from a loyalty account, or other such transaction. Upon verification of the gift, the donor's account is updated (block 63) whereupon the gift is set aside for the recipient. Where the gift is money or loyalty points, for example, any suitable technique may be used to reserve the gift, such as, for example, transferring the money or points into a gift account to await redemption, and debiting the donor's money or loyalty point account accordingly. The gifting transaction may then be reported to the gifting server 10 (block 64) which may then correspond with the donor (block 65) for any desired purpose, such as to inform the donor that the gift has been presented.

FIG. 6 also shows various illustrative processes carried out by the transaction facility server 12 when an acceptance event occurs. The gifting server 10 and the transaction facility server 12 may cooperate to either register the recipient or verify the recipient's prior registration (block 71). Either the gifting server 10 or the transaction facility server 12 (or indeed even another server (not shown)) may host the recipient's account, but in many retail situations the transaction facility server 12 may be particularly interested in hosting the donor's account because it already has the capability of doing so, and allows the transaction facility operator to provide additional services and marketing information to the recipient, including invoking third party services as needed. Illustratively, functions such as secure communications with and security of data on the recipient's personal electronic device may be handled by the gifting server 10, thereby relieving the transaction facility server 12 from the additional and unfamiliar task of performing these functions.

Upon detection of an acceptance event, the gift is transferred from the donor's account to the recipient's account (block 72). Either the gifting server 10 or the transaction facility server 12 (or indeed even another server (not shown)) may perform this transfer operation, but in many retail situations the transaction facility server 12 already performs account debit and credit operations so that allowing the transaction facility server 12 to continue to perform these functions is particularly advantageous. If required, redemptions credentials may be generated and provided to the recipient's personal digital data device (block 73). The acceptance transaction may then be reported to the gifting server 10 (block 74) which may then correspond with the donor and recipient (block 75) for any desired purpose, such as to inform the donor that the gift has been accepted.

FIG. 6 also shows various illustrative processes carried out by the transaction facility server 12 when a redemption event occurs. The transaction facility server 12 detects and verifies the gift redemption (block 81), and decrements the gift from the recipient's account (block 82). The redemption transaction may then be reported to the gifting server 10 (block 83) which may then correspond with the donor and recipient (block 84) for any desired purpose, such as to thank the donor for the gift and enable the recipient to express her appreciation.

When gifting information, acceptance information, and redemption information are provided to the gifting server 10, the gifting server 10 may then generate comprehensive and informative reports for the donors, recipients, transaction facility operators, and indeed for third parties having an interest in the information, in accordance with the privacy and security rights of the donors and recipients. Donors, for example, may be provided with comprehensive gifting reports for all recipients and all transaction facilities, and both donors and recipients may be provided with account balance information. Transaction facilities, for example, may be provided with not only comprehensive redemption and recipient marketing reports.

Suitable security measures may be employed for the gift server 10, the transaction facility server 12, the donor's personal electronic device, and the recipient's personal electronic device to prevent fraud and ensure integrity of the information. One type of suitable security measure is based on the gifting server 10 being aware of some identification code such as a device ID associated with the recipient's personal electronic device. During redemption, the device ID of the recipient's personal electronic device may be provided to the transaction facility along with other required redemption information, in which event the gifting server 19 may confirm that the personal electronic device involved in the redemption process is the recipient's personal electronic device. Many other suitable security measures are well known in the art, and include vendor registration, user identification and password credentials, and SIM encryption.

Figure 7:
FIG. 7 through FIG. 13 are illustrative screen shots for the gifting process.
Figure 8:
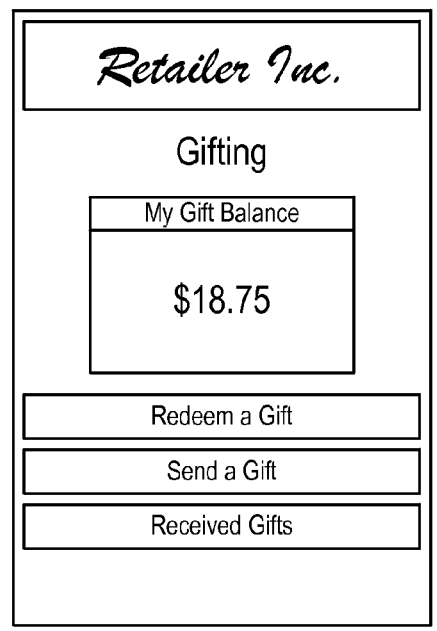
Figure 9:
Figure 10:
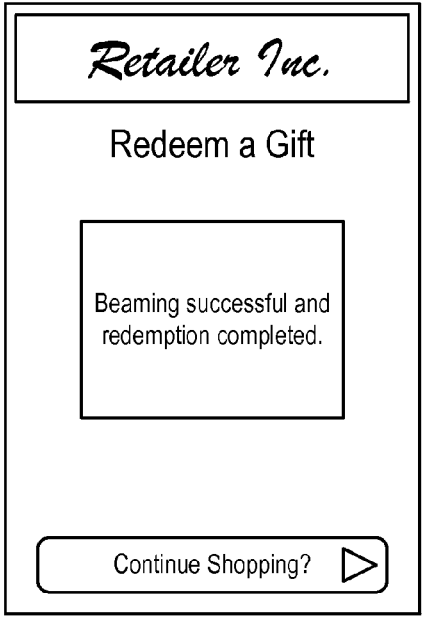
Figure 11:

FIG. 7 through FIG. 13 show various illustrative screens that may be used in a gifting transaction. FIG. 7 shows a screen that may appear on a donor's or recipient's personal electronic device when in a particular retail outlet, for example "Retailer Inc." Various services and departments are displayed, including a Gifting service. FIG. 8 shows that selection of the Gifting service may cause the user's Gift balance to be displayed, along with the options to "Redeem a Gift," "Send a Gift," and "Receive Gifts." FIG. 9 shows that when the "Redeem a Gift" option is selected, the user is informed of all pending Gifts and may elect any of the pending Gifts for redemption. FIG. 10 shows that redemption is easy and convenient using light-simulated barcode technology, which simply beams the gift from the personal electronic device to a barcode scanner and informs the user when the redemption is completed. FIG. 11 shows that for facilities that do not have barcode scanners, the user's personal digital display may display a confirmation code for manual entry by the cashier.

Figure 12:
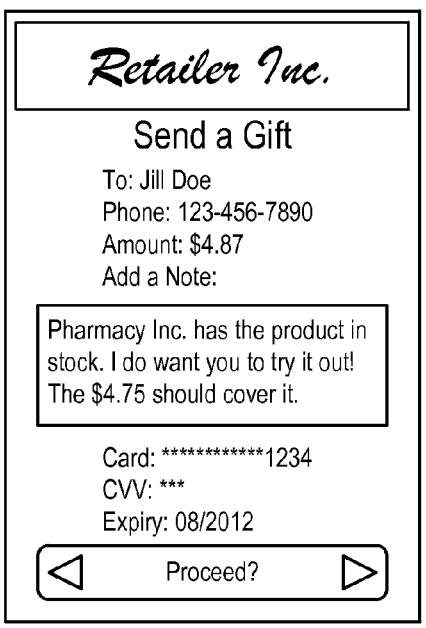
Figure 13:
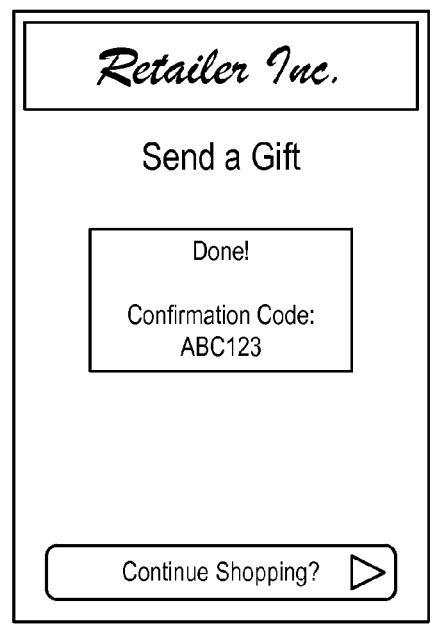

FIG. 12 shows how easy and convenient it is for the user to send a gift. Selection of the "Send a Gift" service (FIG. 8) may cause a donor's screen to appear, which allows the donor to enter information about the recipient, the amount of the Gift, and a message to the recipient, as well as to specify the type of gift, illustratively a money gift using a credit card. FIG. 13 shows that a confirmation code may be generated and provided to the donor when the gift's availability is confirmed and the gift is ready for presentation to the recipient, The gifting transaction described herein may be used in many different ways. Circle of peers gift giving is one example. In consumer product company promotions, for example, the consumer product company may issue Gifts which may be static like many coupons but much more convenient, or which may be specifically tailored for the recipient either as an individual or as a member of a class of individuals, including amount, one or several products or product classifications, geographical area, and so forth. Gift giving may be in a closed-loop environment, such as when a donor gifts a store coupon or promotion to a recipient, or may be open-loop, as an unrestricted money gift.

A "personal electronic device" ("FED") is an electronic device that can be personalized for the user. In one aspect, PED's may be easily carried on the person, and include such devices as mobile phones, personal digital assistants ("FDA"), mobile gaming devices, mobile audio and video players, fobs, USB Flash drives, and advanced remote control units. In another aspect, PED's may be intended for use at a fixed location in a home, office or vehicle, and include such devices as external hard drives, on-demand cable boxes, desktop personal computers, smart appliances, and so forth. Personal electronic devices are suitable for many uses, including communications, entertainment, security, commerce, guidance, data storage and transfer, and so forth, and may be dedicated to a particular use or may be suitable for a combination of uses. Personal electronic devices may have various capabilities that may be used to present redemption information to facilities, including speakers, screens, printers, wired personal area networks such as USB and FireWire, wireless personal area networks such as IrDA, Bluetooth, UWB, Z-Wave and ZigBee, wireless local area networks such as WiFi, SMS text messaging, SS7 signaling protocols, RFID, NFC and the light-simulated barcode technology. The techniques described herein enable the large and growing population of personal electronic devices to securely acquire digital transaction documents from a distributor for use with a transaction facility.

A "transaction facility" is something that is designed or created to enable a transaction, including digital electronic aspects thereof. Examples of transaction facilities include Internet commerce web pages, airport security checkpoints, airport gate check-in counters, building and vehicle secure entry points, event, stadium, arena and destination entry stations, banks and brokerages, and brick-and-mortar points-of-sale such as retail stores and warehouses. The transaction facility includes suitable ways to receive digital information from the user, including wired ports such as USB and memory card readers, wireless ports such as optical, Bluetooth and others, hybrid networks such as intranets, local area networks, and the internet, RFID readers, NFC terminals, and barcode readers and scanners.

The delivery mechanisms within the system are independent of the servers and devices and includes all of the following variables: transport (Internet, web, mobile SMS, MMS, WAP, SS7, and other such channels), type of digital terminals, and type of transaction (security, credit, debit, gift-cards, promotions, and other transaction types). At the points-of sale, any standard way and evolving ways for delivering digital transaction documents may be used, including short codes, barcodes (including 1-D and 2-D barcodes), paper codes, RFID technology, Near Field Communications ("NFC") technology, digital data streams, packets, and so forth. The delivery technique is set by the transaction facility (e.g. a store or the retailer to redeem the promotion under use).

Advantageously, personal electronic devices may be designed with processors (including microprocessors, controllers, and so forth) and memory, and data and computer programs may be stored on the personal electronic device in the memory. The personal electronic device may include, for example, static or dynamic RAM ("SRAM" or "DRAM," respectively) memory, FLASH memory, or any other type of memory. Although a device may be specialized as either a donor device or as a recipient device, it is generally desirable for a single device to be provided with both donor and recipient capabilities. In this case, donor and recipient computer programs may be stored in the memory of the personal electronic device.

The concept of gifting may be extended into many different areas. One such area is gifting to oneself, and an example is gifting a merchant gift card to oneself to make a purchase at the merchant's facility, whether brick-and-mortar or online. Gifting to oneself may be combined with gifting to another, as when a donor purchases two tickets to an event, and gifts one ticket to himself and the other to a friend so that each person have his own ticket. Another such area is gifting to a family member, and an example is gifting a merchant gift card to a son or daughter who does not have enough money to make a purchase at the merchant's facility. Another such area is gifting to a business colleague, and an example is gifting a merchant gift card to a business colleague to purchase business supplies at the merchant's facility, with the expectation of reimbursement. Reimbursement may be requested automatically by the gifting server 10, which may use any suitable messaging technique to report the "redemption" of the gift by the business colleague back to the donor or to a surrogate of the donor such as the donor's accounting department.

Surrogates are third persons authorized by the donor or recipient to make or receive a gift. A donor's surrogate may be an individual person such as a family member, coworker, or legal agent given authorization to gift from the donor's bank or credit accounts. A surrogate may be a group of individuals such as a sales force, authorization to gift from a corporation's bank or credit accounts up to a certain amount.

Redemption may be tracked and the results accumulated to provide statistical data. In a case where donors are members of a corporate sales force, for example, redemption data may be correlated with orders received to provide some indication of the effectiveness of money spent on corporate gifting.

Gifting may also be used for invitations. A person who is holding a party may gift invitations to those whom she wishes to attend, and access to the party may be controlled by redeeming the invitations. In a similar manner, access to corporate buildings and meetings may be controlled by gifting invitations to the persons who are to attend. In the case of a confidential meeting or an access-controlled building and for which an attendee is not a corporate employee or contractor, the redemption process may include the requirement to review and digitally sign a nondisclosure agreement. To maintain control over access, the invitation may be personal to the invitee so that the security system can identify the person and grant or deny access as desired, or for simple security systems, a rolling code may be used for access to the building so that the code placed in the invitation is valid for only a short time.

Figure 14:
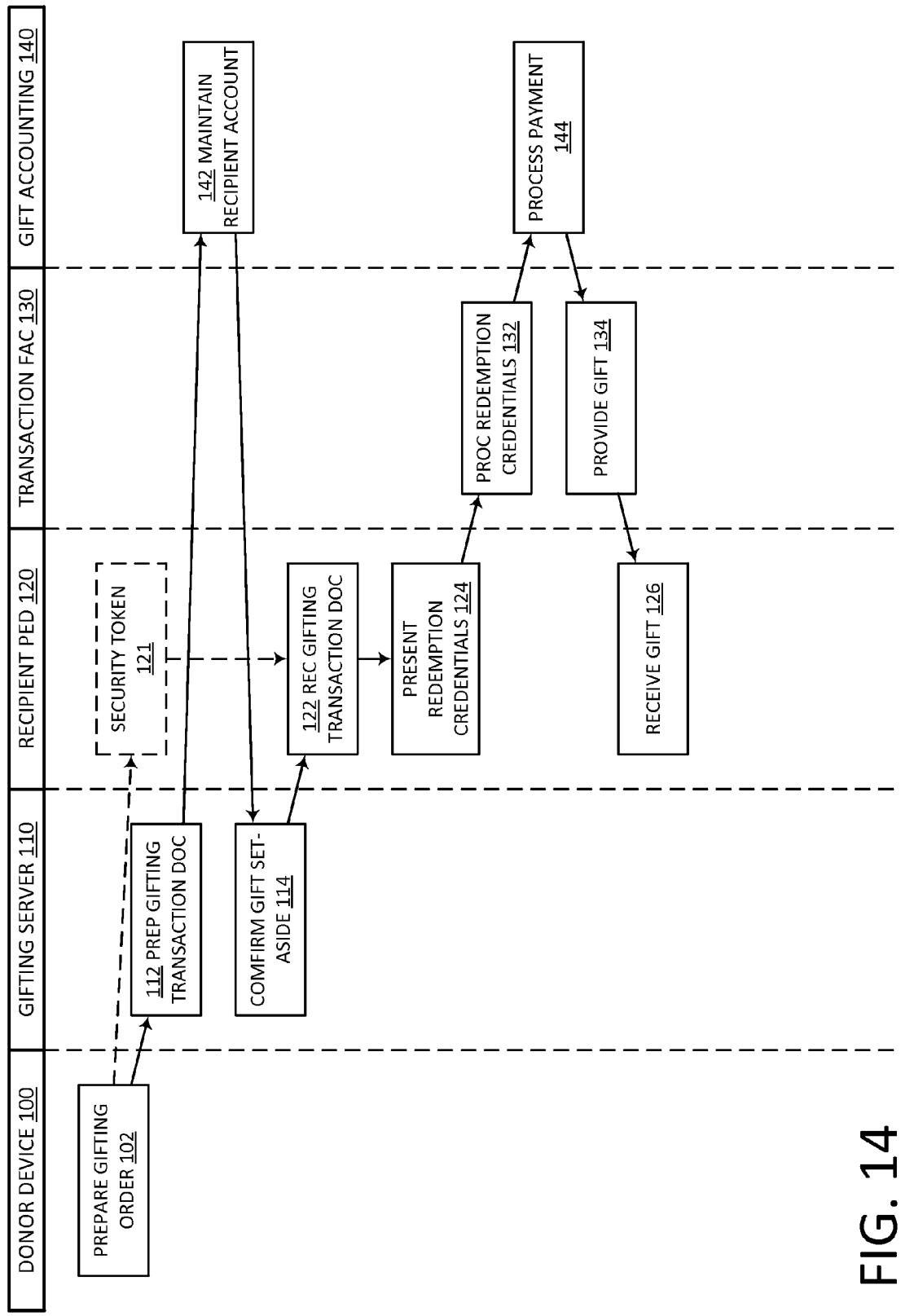
FIG. 14 is a schematic flow diagram of a general method for electronic gifting.

FIG. 14 shows an illustrative general method of gifting which uses gift accounting. As used herein, the term "gifting transaction document" refers to a set of data relating to a gifting transaction, and not the form in which the data is communicated. The data may be passed as individual parameters, as a data set, in a document format such as HTML, or in any other desired manner. As used herein, the term "redemption credentials" refers to data required by a transaction facility to complete a transaction. Redemption credentials may be as simple as a coupon code or an account number, or may be more complex and include transaction facility identification data, gift item designation data, recipient verification data, and an account number. Redemption credentials may be encrypted or unencrypted, as desired.

A donor prepares a gifting order (block 102) using a donor device 100, and communicates the gifting order to a gifting server 110. If desired, the gifting order may include a security token, which is also communicated to the recipient's personal electronic device 120 (block 121) for use in avoiding spam and phishing attacks. The gifting server 110 prepares a gifting transaction document of any suitable type, including the generation of redemption credentials (block 112). Gift accounting 140 is then performed; specifically the recipient's account is maintained in accordance with the type of gift designated (block 142). For a new recipient, gift account maintenance may involve creating the recipient's account, as well as incrementing the recipient's account based on the gift designation. For a recipient who already has an account, account maintenance may involve incrementing the recipient's account based on the gift designation. Other type of gift account maintenance may be performed as desired. The gifting server 110 confirms that the gift has been "set aside" (block 114), and communicates the gifting transaction document to the recipient's personal electronic device 120 (block 122). Aside from containing the redemption credentials, the gifting transaction document may contain a security token or other security information, and information about the gift, the donor, the redemption process, corresponding with the donor, and use of social networking. The recipient uses her personal electronic device to present the redemption credentials to a transaction facility 130 (block 124) using any suitable communications such as, for example, light simulated barcode technology or NFC technology. The transaction facility 130 processes the redemption credentials to ensure that the transaction is valid and obtain payment (block 132), Gift accounting 140 is again performed; specifically the recipient's account is maintained in accordance with redemption of the gift (block 144) by decrementing the recipient's account based on the gift designation. The transaction facility 130 provides the gift to the recipient (block 134) who the receives the gift (block 126). The gift accounting 140 may be performed in any desired manner; illustratively, the gifting server 110 may perform the gift accounting 140, a transaction facility server (not shown) may perform the gift accounting 140, or a third party server (not shown) may perform the gift accounting 140.

Figure 15:
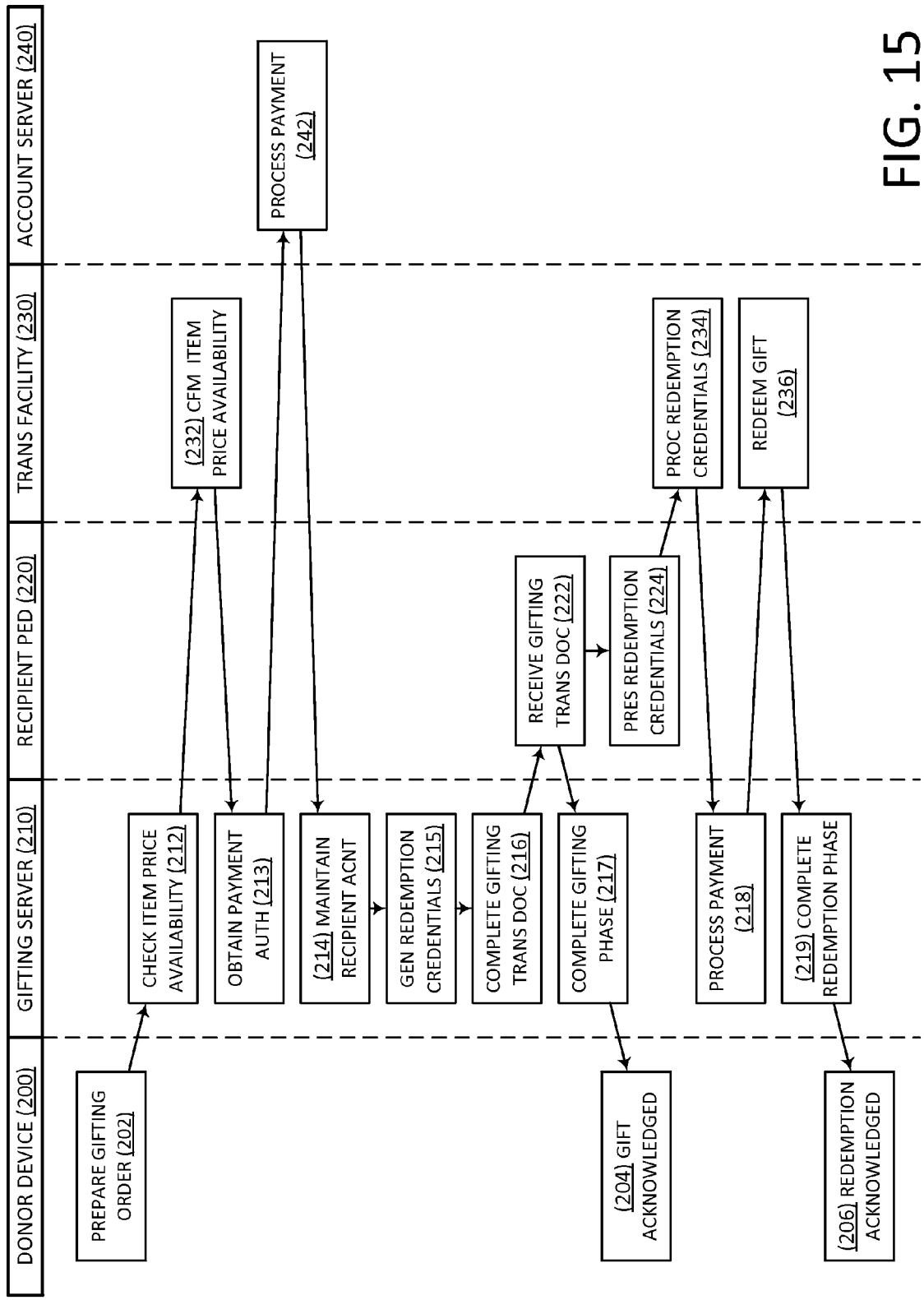
FIG. 15 is a schematic flow diagram of a method for electronic gifting which maintains the recipient's account on a gifting server.

FIG. 15 shows an illustrative method of making a monetary gift from an account, illustratively a credit card account or a bank account, using gift accounting on a gifting server. A donor prepares a gifting order (block 202) using a donor device 200, and communicates the gifting order to a gifting server 210. The gifting server 210 prepares a gifting transaction document of any suitable type. As part of the document preparation, the gifting server 210 may check the idem designation, the item price, and the item availability (block 212) with the transaction facility 230 (block 232), obtain payment authorization (block 213) from an account server 240, which processes the gift payment (242) and pays the gift value to the gifting server 210. The gifting server 210 in turn maintains the recipient's account (block 214) by adding the gift value to the recipient's account, generates redemption credentials (block 215), and performs other operations as may be desired to complete the gifting transaction document (block 216). The gifting server 210 then communicates the gifting transaction document to the recipient's PED 220, which receives the gifting transaction document (block 222). Upon receipt of the gifting transaction document, the recipient's PED 220 acknowledges receipt to the gifting server 210, which in turn carries out any additional operations to complete the gifting phase (block 217) and acknowledges completion of the gifting phase to the donor device 200 so that the gift can be acknowledged to the donor (block 204). Additionally, upon receipt of the gifting transaction document, the recipient's PED 220 presents the redemption credentials to the transaction facility 230 (block 224), which processes the redemption credentials (block 234) and notifies the gifting server 210 so that the value of the gift may be transferred from the recipient's gift account to the transaction facility 230 in due course in any desired manner (block 218). The transaction facility 230 then redeems the gift (block 236), reports redemption to the gifting server 210 which in turn carries out any additional operations to complete the redemption phase (block 219) and acknowledges completion of the gifting phase to the donor device 200 so that redemption of the gift can be acknowledged to the donor (block 206).

Figure 16:
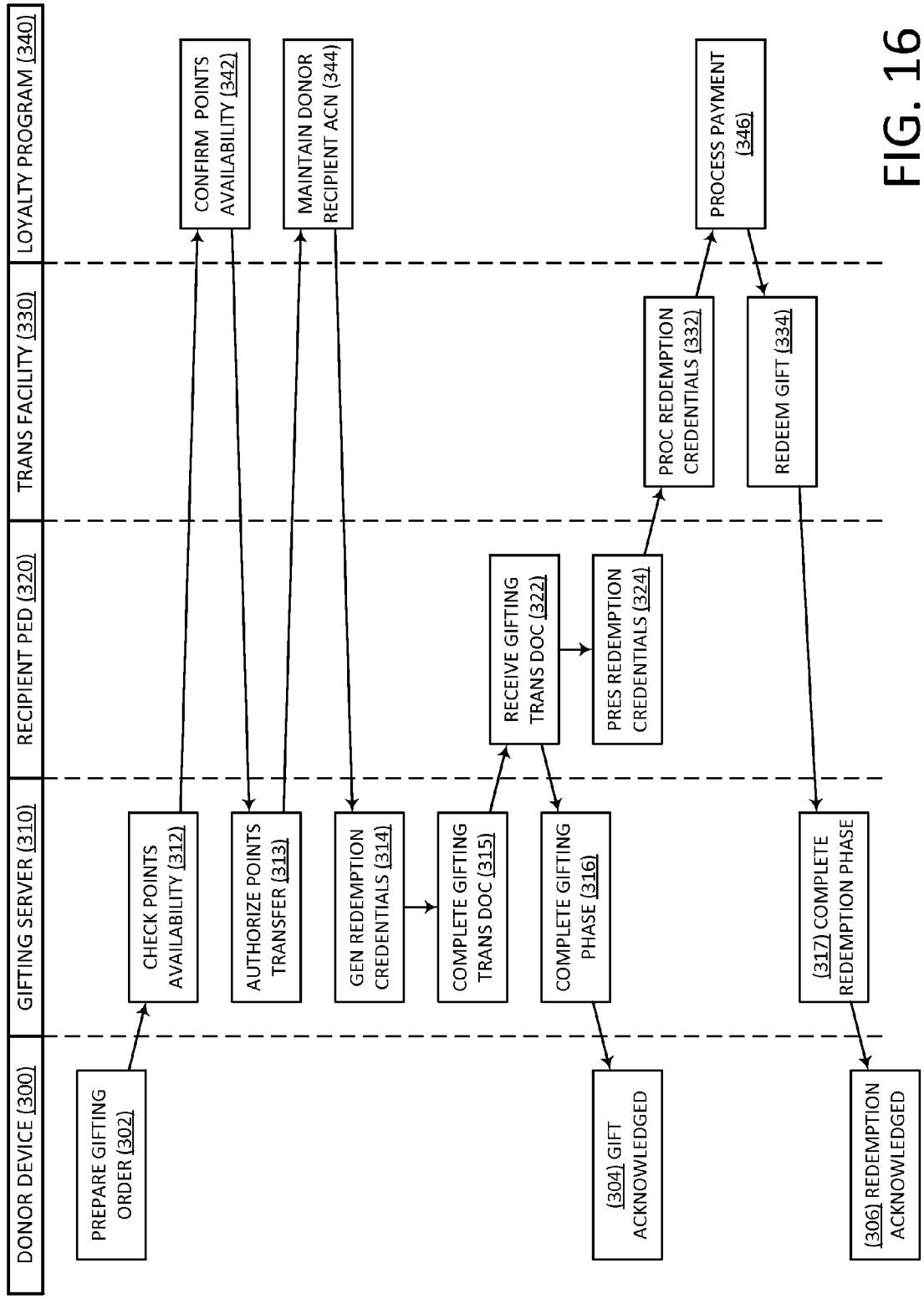
FIG. 16 is a schematic flow diagram of a method for electronic gifting which maintains the recipient's loyalty program account on a loyalty program server.

FIG. 16 shows an illustrative method of making a gift from an account controlled by other than the gifting server, illustratively a loyalty program account. A donor prepares a gifting order (block 302) using a donor device 300, and communicates the gifting order to a gifting server 310. The gifting server 310 prepares a gifting transaction document of any suitable type. As part of the document preparation, the gifting server 310 may check for points availability (block 312) with the loyalty program server 340 (block 342), authorizes the transfer of points (block 313) which is processed by the loyalty program server 340 by transferring points from the donor's loyalty program account to the recipient's loyalty program account (block 344). If the recipient does not have a loyalty program account, creation of the account may be done as part of the recipient's account maintenance (block 344). The gifting server 310 then generates redemption credentials (block 314), and performs other operations as may be desired to complete the gifting transaction document (block 315). The gifting server 310 then communicates the gifting transaction document to the recipient's PED 320, which receives the gifting transaction document (block 322). Upon receipt of the gifting transaction document, the recipient's PED 320 acknowledges receipt to the gifting server 310, which in turn carries out any additional operations to complete the gifting phase (block 316) and acknowledges completion of the gifting phase to the donor device 300 so that the gift can be acknowledged to the donor (block 304). Additionally, upon receipt of the gifting transaction document, the recipient's PED 320 presents the redemption credentials to the transaction facility 330 (block 324), which processes the redemption credentials (block 332) and notifies the loyalty program server 340 so that the points may be deducted from the recipient's loyalty program account (block 346). The transaction facility 330 then redeems the gift (block 334), reports redemption to the gifting server 310 which in turn carries out any additional operations to complete the redemption phase (block 317) and acknowledges completion of the gifting phase to the donor device 300 so that redemption of the gift can be acknowledged to the donor (block 306).

FIG. 17 shows an illustrative method of making a monetary gift from an account, illustratively a credit card account or a bank account, using gift accounting on a gifting server. The method of FIG. 17 differs from the methods shown in FIGS. 14, 15 and 16 in that the credit card or bank account number are presented by the recipient's PED to the transaction facility. Advantageously no changes whatsoever are required of the transaction facility. The tradeoff is that the donor's account information is resident on the recipient's PED.

A donor prepares a gifting order (block 402) using a donor device 400, and communicates the gifting order to a gifting server 410. The gifting server 410 prepares a gifting transaction document of any suitable type. As part of the document preparation, the gifting server 410 may check the idem designation, the item price, and the item availability (block 412) with the transaction facility 430 (block 432), check the payment credentials (block 413) with account services 440 to confirm that sufficient funds are available (block 442), generate redemption credentials (block 414), and perform such other operations as may be desired to complete the gifting transaction document (block 415). The gifting server 410 then communicates the gifting transaction document to the recipient's PED 420. Upon receipt of the gifting transaction document (block 422), the recipient's PED 420 acknowledges receipt to the gifting server 410, which in turn carries out any additional operations to complete the gifting phase (block 416) and acknowledges completion of the gifting phase to the donor device 400 so that the gift can be acknowledged to the donor (block 404). Additionally, upon receipt of the gifting transaction document, the recipient's PED 420 presents the redemption credentials to the transaction facility 430 (block 424). The redemption credentials include the donor's account number. The transaction facility processes the redemption credentials (block 434), including communicating with account services 440 in any desired manner, either over the network or by direct dialup, to obtain payment for the gift (block 444). Once the payment is processed, the transaction facility 430 redeems the gift (block 436) and notifies the gifting server 410, which in turn carries out any additional operations to complete the redemption phase (block 417) and acknowledges completion of the gifting phase to the donor device 400 so that redemption of the gift can be acknowledged to the donor (block 606).

The various embodiments of the invention described herein are illustrative. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A method of gifting comprising:
    preparing a gifting order on a donor device, the gifting order including a gift designator designating a gift;
    communicating the gifting order to a gifting server;
    preparing a gifting transaction document on the gifting server, the gifting transaction document including redemption credentials;
    incrementing a recipient account in accordance with the gift designator;
    communicating the gifting transaction document to a personal electronic device;
    communicating a security token from the donor device to the personal electronic device;
    authenticating the gifting server through comparing the security token communicated from the donor device to a security token received from the gifting server, said comparing being performed at the personal electronic device;
    beaming the redemption credentials from the personal electronic device to a transaction facility using a variable light source of the personal electronic device to transmit a light simulated barcode;
    decrementing the recipient account in response to the redemption credentials beaming step, in accordance with the gift designator; and
    providing the gift to the recipient from the transaction facility.

2. The method of claim 1 further comprising authorizing payment for the gift, in accordance with the gift designator, upon approval from a remote account server over a network, prior to the incrementing step, wherein:
    the recipient account is maintained on the gifting server;
    the gift payment authorization step is performed by the gifting server;
    the incrementing step is performed by the gifting server; and
    the decrementing step is performed by the gifting server.

3. The method of claim 1 further comprising authorizing payment for the gift, in accordance with the gift designator, upon approval from a remote account server over a network, prior to the incrementing step, wherein:
    the recipient account is maintained on the remote account server;
    the gift payment authorization step is performed by the gifting server;
    the incrementing step is performed by the remote account server; and
    the decrementing step is performed by the remote account server.

4. A method of gifting comprising:
    establishing a gifting order comprising a transaction facility designator designating a transaction facility, a gift designator designating a gift, a recipient designator designating a recipient of the gift, and a payment designator designating a payment method for the gift;
    communicating the gifting order to a gifting server over a computer network;
    generating in the gifting server a transaction facility identifier in accordance with the transaction facility designator;
    generating in the gifting server a gift identifier in accordance with the gift designator;
    generating in the gifting server a payment authorization in accordance with the payment method;
    communicating a gifting transaction document from the gifting server to a personal electronic device of a recipient in accordance with the recipient designator, the gifting transaction document comprising the transaction facility identifier, the gift identifier, and a payment authorization;
    communicating a security token from the donor device to the personal electronic device;
    authenticating the gifting server through comparing the security token communicated from the donor device to a security token received from the gifting server, said comparing being performed at the personal electronic device;
    beaming the gifting transaction document to a transaction facility from the personal electronic device using a variable light source of the personal electronic device to transmit a light-simulated barcode;
    confirming the transaction facility from the transaction facility identifier, the gift from the gift identifier, and payment from the payment authorization; and providing the gift from the transaction facility to the recipient, after the presenting step.

5. A system for gifting comprising:

a donor device comprising a processor and a memory coupled to the processor, the memory having computer programs stored therein for preparing a gifting order, the gifting order including a gift designator designating a gift;

a gifting server comprising a processor and a memory coupled to the processor, the memory having computer programs stored therein for receiving the gifting order; for preparing a gifting transaction document from the gifting order, the gifting transaction document including redemption credentials; and for incrementing a recipient account in accordance with the gift designator;

a recipient personal electronic device comprising a processor and a memory coupled to the processor, the memory having computer programs stored therein for receiving the gifting transaction document, and for beaming the redemption credentials from the personal electronic device to a transaction facility using a variable light source of the personal electronic device to transmit a light-simulated barcode, and the recipient personal electronic device being configured to authenticate the gifting server by comparing a security token received at the recipient personal electronic device from the donor device to a security token received at the recipient personal electronic device from the gifting server;

the memory of the gifting server further having computer programs stored therein for decrementing the recipient account in response to beaming of the redemption credentials by the recipient personal electronic device and in accordance with the gift designator; and a network coupling the donor device, the gifting server and the recipient personal electronic device to one another for communicating the gifting order from the donor device to the gifting server, and for communicating the gifting transaction document from the gifting server to a personal electronic device.

6. A system for gifting comprising:

a donor device comprising a processor and a memory coupled to the processor, the memory having computer programs stored therein for preparing a gifting order, the gifting order including a gift designator designating a gift;

a gifting server having a processor and a memory coupled to the processor, the memory having computer programs stored therein for receiving the gifting order, and for preparing a gifting transaction document from the gifting order, the gifting transaction document including redemption credentials;

a remote account server comprising a processor and a memory coupled to the processor, the memory having computer programs stored therein for processing requests for payment authorization, and for incrementing a recipient account in accordance with the gift designator;

a recipient personal electronic device having a processor and a memory coupled to the processor, the memory having computer programs stored therein for receiving the gifting transaction document, and for beaming the redemption credentials from the personal electronic device to a transaction facility using a variable light source of the personal electronic device to transmit a light-simulated barcode, and the recipient personal electronic device being configured to authenticate the gifting server by comparing a security token received at the recipient personal electronic device from the donor device to a security token received at the recipient personal electronic device from the gifting server;

the memory of the remote account server further having computer programs stored therein for decrementing the recipient account in response to beaming of the redemption credentials by the recipient personal electronic device and in accordance with the gift designator; and a network coupling the donor device, the gifting server, the remote account server, and the recipient personal electronic device to one another for communicating the gifting order from the donor device to the gifting server, for communicating the gift designator from the gifting server to the remote account server, and for communicating the gifting transaction document from the gifting server to a personal electronic device.

7. A server for gifting comprising:

a processor; and a memory coupled to the processor, the memory having computer programs stored therein for:

receiving a gifting order from a donor device over a network, the gifting order including a gift designator designating a gift;

preparing a gifting transaction document from the gifting order, the gifting transaction document including redemption credentials, the redemption credentials being transmittable by beaming a variable light source of a recipient personal electronic device as a light-simulated barcode; and communicating a security token received from the donor device to the recipient personal electronic device for authenticating the server to the recipient personal electronic device.

8. The server of claim 7 wherein the memory further has computer programs stored therein for:

communicating the gifting transaction document to a recipient personal electronic device over a network;

incrementing a recipient account in accordance with the gift designator; and decrementing the recipient account in response to beaming of the redemption credentials by the recipient personal electronic device and in accordance with the gift designator.

9. A personal electronic device for gifting comprising:

a processor;

a presentation component coupled to the processor; and a memory coupled to the processor, the memory having computer programs stored therein for:

preparing a gifting order on a donor device, the gifting order including a gift designator designating a gift;

communicating the gifting order to a gifting server;

receiving a gifting transaction document from the gifting server, the gifting transaction document including redemption credentials;

authenticating the gifting server by comparing a security token received at a recipient device from the donor device to a security token received at the recipient device from the gifting server; and beaming the redemption credentials from the presentation component to a transaction facility, wherein the presentation component comprises a variable light source, and the memory further has computer programs for beaming the redemption credentials from the variable light source as a light-simulated barcode.

10. The personal electronic device of claim 9 wherein:
the presentation component further comprises an NFC circuit; and
the memory further has computer programs for presenting the redemption credentials from the variable light source as a NFC signal.

\* \* \* \* \*